(12) United States Patent
Ishibashi (10) Patent No.: US 12,385,563 B2
(45) Date of Patent: Aug. 12, 2025

(54) DRIVE DEVICE

(71) Applicant: TOYOTA JIDOSHA KABUSHIKI KAISHA, Toyota (JP)

(72) Inventor: Masayuki Ishibashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/910,328

(22) Filed: Oct. 9, 2024

(65) Prior Publication Data

US 2025/0129842 A1 Apr. 24, 2025

(30) Foreign Application Priority Data

Oct. 20, 2023 (JP) ................................. 2023-180981

(51) Int. Cl.
| | |
|---|---|
| *F16H 57/04* | (2010.01) |
| *B60K 1/00* | (2006.01) |
| *F16H 57/037* | (2012.01) |
| *F16H 57/02* | (2012.01) |
| *H02K 5/20* | (2006.01) |
| *H02K 7/116* | (2006.01) |

(52) U.S. Cl.
CPC ........... *F16H 57/0476* (2013.01); *B60K 1/00* (2013.01); *F16H 57/037* (2013.01); *F16H 57/0415* (2013.01); *F16H 57/0436* (2013.01); *B60K 2001/001* (2013.01); *B60K 2001/006* (2013.01); *F16H 2057/02026* (2013.01); *F16H 2057/02034* (2013.01); *F16H 2057/02052* (2013.01); *F16H 57/0483* (2013.01); *H02K 5/20* (2013.01); *H02K 7/116* (2013.01)

(58) Field of Classification Search
CPC ............... F16H 57/0476; F16H 57/037; F16H 57/0415; F16H 57/0436; F16H 2057/02026; F16H 2057/02034; F16H 2057/02052; F16H 57/0483; H02K 5/20; H02K 7/116; H02K 9/19; B60K 2001/006
USPC ........ 475/150, 159, 160; 184/6.12, 26, 104.1
See application file for complete search history.

(56) References Cited

U.S. PATENT DOCUMENTS

| | | | |
|---|---|---|---|
| 10,272,767 B1 | 4/2019 | Tang et al. | |
| 2022/0294317 A1* | 9/2022 | Nakamura | ............... H02K 5/04 |
| 2022/0376588 A1* | 11/2022 | Nakamura | .......... F16H 57/0417 |
| 2023/0069613 A1* | 3/2023 | Osuga | .................... H02K 7/083 |

(Continued)

FOREIGN PATENT DOCUMENTS

| | | |
|---|---|---|
| DE | 102021213004 A1 | 5/2023 |
| JP | 2020-174478 A | 10/2020 |

(Continued)

*Primary Examiner* — Roger L Pang
(74) *Attorney, Agent, or Firm* — Oliff PLC (57) ABSTRACT

A drive device for a vehicle includes a casing, a motor, a gear unit, an electric unit, and a heat medium pathway. The motor shaft is provided with a flow passage at a shaft center of a motor shaft. The casing includes a motor chamber, a gear chamber, and an electric unit chamber. The heat medium pathway is configured to supply a heat medium to the flow passage. One end of the motor shaft on one side in an axial direction is positioned in the gear chamber. At least a part of the electric unit chamber is positioned on the one side in the axial direction relative to the one end of the motor shaft. The heat medium pathway is connected with the flow passage at the one end of the motor shaft.

11 Claims, 6 Drawing Sheets

(56) References Cited

U.S. PATENT DOCUMENTS

| | | | |
|---|---|---|---|
| 2024/0235316 A1 | 7/2024 | Torii et al. | |
| 2024/0397679 A1 | 11/2024 | Takahashi et al. | |
| 2024/0429785 A1* | 12/2024 | Mori | F16H 57/0457 |
| 2025/0132631 A1* | 4/2025 | Ishibashi | F16H 57/0476 |
| 2025/0132634 A1* | 4/2025 | Ishibashi | H02K 7/006 |

FOREIGN PATENT DOCUMENTS

| | | |
|---|---|---|
| JP | 2022-030829 A | 2/2022 |
| WO | 2023/008197 A1 | 2/2023 |
| WO | 2023/054438 A1 | 4/2023 |

\* cited by examiner

DRIVE DEVICE

CROSS-REFERENCE TO RELATED APPLICATION

This application claims priority to Japanese Patent Application No. 2023-180981 filed on Oct. 20, 2023, incorporated herein by reference in its entirety.

BACKGROUND

1. Technical Field

The technology disclosed in the specification relates to a drive device.

2. Description of Related Art

There is known an integrated drive device including a motor chamber, a gear chamber, and an electric unit chamber. Further, there is known a so-called shaft-center cooling technology in which a flow passage for a heat medium is formed at the shaft center of a motor shaft. Japanese Unexamined Patent Application Publication No. 2020-174478 discloses a related technology.

SUMMARY

For the integrated drive device, the reduction in the size of the drive device is demanded. However, for employing the shaft-center cooling, it is necessary to provide a heat medium pathway for supplying the heat medium in the shaft center of the motor shaft. Depending on the manner of the arrangement of the heat medium pathway, the size of the drive device can be increased by the heat medium pathway.

A drive device for a vehicle according to a first aspect of the present disclosure includes a casing, a motor, a gear unit, an electric unit, and a heat medium pathway. The motor is housed in a motor chamber, and includes a motor shaft. The motor shaft is provided with a flow passage at a shaft center of the motor shaft. The casing includes the motor chamber, a gear chamber, and an electric unit chamber. The gear unit is housed in the gear chamber, and is configured to be mechanically connected with one end of the motor shaft on one side in an axial direction. The electric unit is housed in the electric unit chamber, and is configured to be electrically connected with the motor. The heat medium pathway is configured to supply a heat medium stored in the gear chamber, to the flow passage of the motor shaft. The one end of the motor shaft is positioned in the gear chamber. At least a part of the electric unit chamber is positioned on the one side in the axial direction relative to the one end of the motor shaft. The heat medium pathway is connected with the flow passage of the motor shaft at the one end of the motor shaft.

As the heat medium, various types can be adopted. For example, the heat medium may be oil, water, air, or the like. In the above configuration, it is possible to cause the electric unit chamber to protrude to the one side in the axial direction of the one end of the motor shaft. Moreover, the heat medium pathway is connected with the one end of the motor shaft. Thereby, the width of the drive device in the axial direction can be determined not by the heat medium pathway but by the electric unit chamber. Accordingly, it is possible to restrain the width of the drive device in the axial direction from being increased by the heat medium pathway.

In the drive device according to the first aspect of the present disclosure, at least the part of the electric unit chamber may be positioned on the one side in the axial direction relative to the heat medium pathway.

In the above configuration, it is possible to restrain the width of the drive device in the axial direction from being increased by the heat medium pathway.

In the drive device according to the first aspect of the present disclosure, at least the part of the electric unit chamber may overlap with the gear chamber in a direction perpendicular to the axial direction.

In the above configuration, it is possible to decrease the protrusion amount of the electric unit chamber on the one side in the axial direction. It is possible to achieve the reduction in the size of the drive device.

In the drive device according to the first aspect of the present disclosure, at least the part of the electric unit chamber may overlap with the motor chamber in the axial direction.

In the above configuration, it is possible to decrease the protrusion amount of the electric unit chamber in the direction perpendicular to the axial direction. It is possible to achieve the reduction in the size of the drive device.

In the drive device according to the first aspect of the present disclosure, at least a part of the heat medium pathway may be positioned on the one side in the axial direction relative to the gear chamber.

In the drive device according to the first aspect of the present disclosure, the part of the electric unit chamber may be positioned on an extension line of the motor shaft to the one side in the axial direction. The one end of the motor shaft may be supported by a partition wall between the gear chamber and the electric unit chamber. The heat medium pathway may pass through the interior of the electric unit chamber, may penetrate through the partition wall, and may be connected with the flow passage.

In the above configuration, it is possible to supply the heat medium from the one end of the motor shaft.

In the drive device according to the first aspect of the present disclosure, the heat medium pathway may pierce through a wall surface from the exterior of the casing, and may extend to the interior of the electric unit chamber of the casing, the wall surface demarcating the electric unit chamber.

In the above configuration, it is possible to configure the heat medium pathway that passes through the wall surface of the gear chamber and the interior of the electric unit chamber and that reaches the one end of the motor shaft.

In the drive device according to the first aspect of the present disclosure, the drive device may further include a pump configured to feed the heat medium stored in a lower portion of the gear chamber, to the heat medium pathway. The pump may be positioned on the one side in the axial direction or the other side in the axial direction relative to the gear chamber.

In the drive device according to the first aspect of the present disclosure, the drive device may further include a heat medium cooler. The heat medium cooler may be disposed on the heat medium pathway and may be configured to cool the heat medium. The heat medium cooler may be positioned on the one side in the axial direction or the other side in the axial direction relative to the gear chamber.

In the drive device according to the first aspect of the present disclosure, the motor chamber and the gear chamber may be connected by a communication hole through which the heat medium is configured to flow. The electric unit chamber may be isolated from the motor chamber and the gear chamber in a liquid-tight manner.

In the drive device according to the first aspect of the present disclosure, the casing may include a motor case including the motor chamber, a gear case configured to demarcate at least a part of the gear chamber, and an electric unit case configured to demarcate at least the part of the electric unit chamber. The gear case and the electric unit case may be fastened to the motor case by a plurality of fastening members.

In the above configuration, it is possible to mount the gear case and the electric unit case independently from each other. It is possible to enhance the ease of the assembly of the drive device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiment 1

Configuration of Drive Device 1

Figure 1:
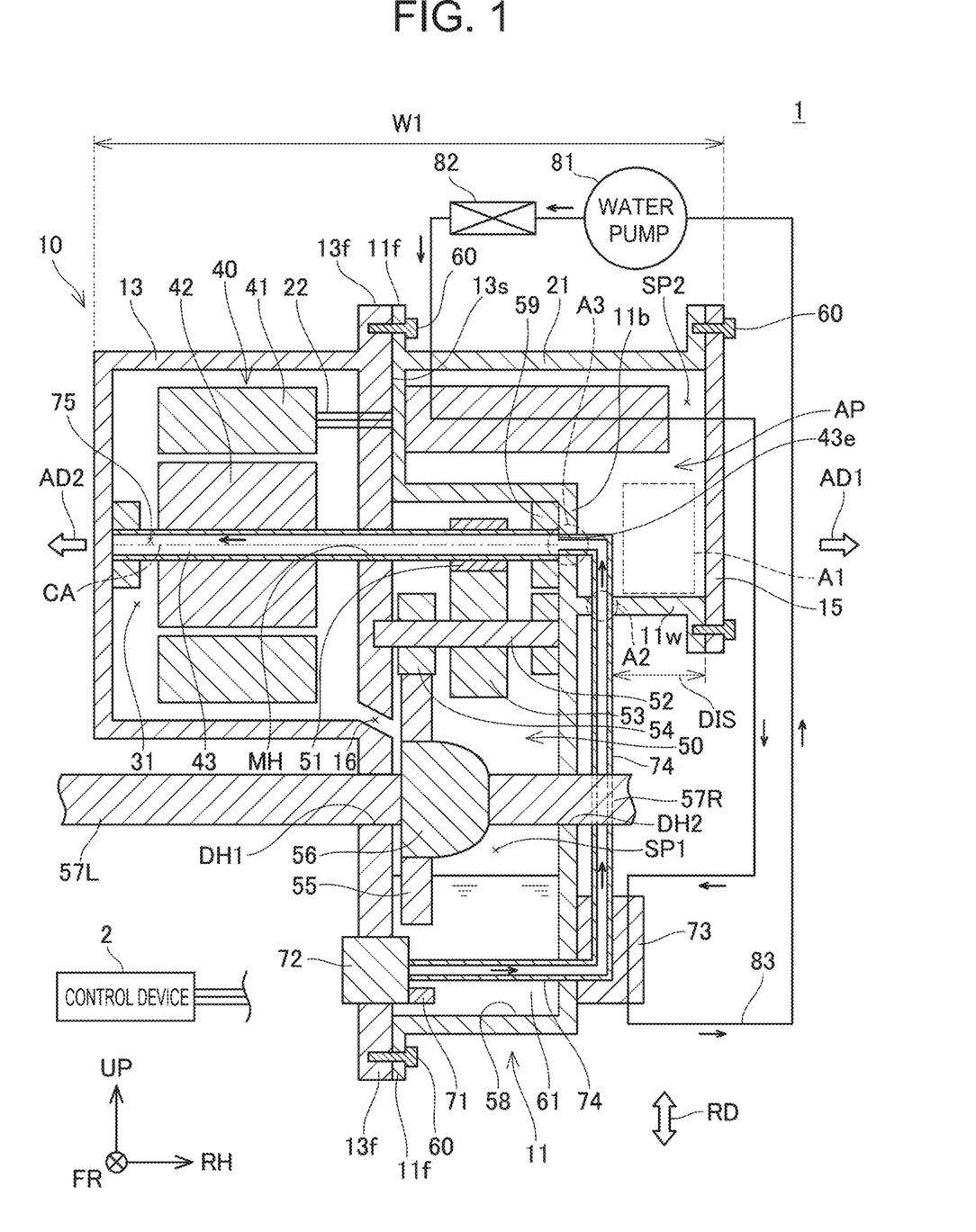
FIG. 1 is a sectional view showing a schematic configuration of a drive device.

FIG. 1 is a sectional view showing a schematic configuration of a drive device 1 in an embodiment. The drive device 1 is an integrated device in which a motor, a gear unit, and an electric power conversion unit for controlling the motor are contained in an identical casing. Directions FR, RH, and UP show orientations of the drive device 1 with respect to a vehicle (battery electric vehicle) when the drive device 1 is equipped in the vehicle. The direction FR shows the forward direction in the front-rear direction of the vehicle. The direction RH shows the rightward direction in the right-left direction (width direction) of the vehicle. The direction UP shows the upward direction in the height direction of the vehicle. The same goes for the other figures. In FIG. 1, a plurality of shafts (a motor shaft 43, a counter shaft 52, and drive shafts 57L, 57R) is shown while being arranged so as to be positioned on an identical plane.

The drive device 1 is controlled by a control device 2. The control device 2 includes a CPU, a RAM, a ROM, input and output interfaces, and the like. The control device 2 is connected with an electric power conversion unit 21 and the like by unillustrated signal wires.

The drive device 1 includes a casing 10. The casing 10 includes a first case 11, a motor case 13, and a lid portion 15. Each of the first case 11 and the motor case 13 may be a casting.

The first case 11 includes a first flange 11f that extends along an outer circumference of the first case 11. The motor case 13 includes a motor case flange 13f that extends along an outer circumference of the motor case 13. The first case 11 is fastened to the motor case 13 by a plurality of bolts 60.

Further, the first case 11 includes an opening portion AP. The lid portion 15 is fastened to the first case 11 by a plurality of bolts 60, so as to close the opening portion AP.

The motor case 13 includes a motor chamber 31. In the motor chamber 31, a motor 40 is contained. In other words, the motor case 13 houses the motor 40. The motor 40 includes a stator 41, a rotor 42, and the motor shaft 43. The stator 41 has a cylindrical shape. The rotor 42 is disposed in the interior of the stator 41 in a rotatable manner. The motor shaft 43 includes a central axis CA.

Further, the motor case 13 includes a facing surface 13s that faces the first case 11. On the facing surface 13s, a motor shaft hole MH and a drive shaft hole DH1 are formed. The motor shaft 43 passes through the motor shaft hole MH. The drive shaft 57L on the left side passes through the drive shaft hole DH1.

The first case 11 has a box shape in which one surface is opened. The first case 11 is fastened to the facing surface 13s, such that the opening surface is closed by the facing surface 13s. Thereby, a gear chamber SP1 is demarcated between the motor case 13 and the first case 11. In the gear chamber SP1, a gear unit 50 is contained. In other words, the first case 11 houses the gear unit 50.

The gear unit 50 includes a shaft gear 51, the counter shaft 52, a first counter gear 53, a second counter gear 54, a ring gear 55, and a differential gear 56. The shaft gear 51 is attached to the motor shaft 43. Thereby, the gear unit 50 and the motor 40 are mechanically connected. The first counter gear 53 and the second counter gear 54 are attached to the counter shaft 52. The first counter gear 53 engages with the shaft gear 51. The second counter gear 54 engages with the ring gear 55. The ring gear 55 is attached to the differential gear 56. The drive shafts 57L, 57R extend from the differential gear 56 in the vehicle width direction. The drive shaft 57R passes through a drive shaft hole DH2 that is formed on the first case 11. At a lower portion of the gear chamber SP1, a storage portion 58 is provided. In the storage portion 58, oil 61 is stored. A part of the gear unit 50 is immersed in the oil 61 stored in the storage portion 58.

Figure 2:
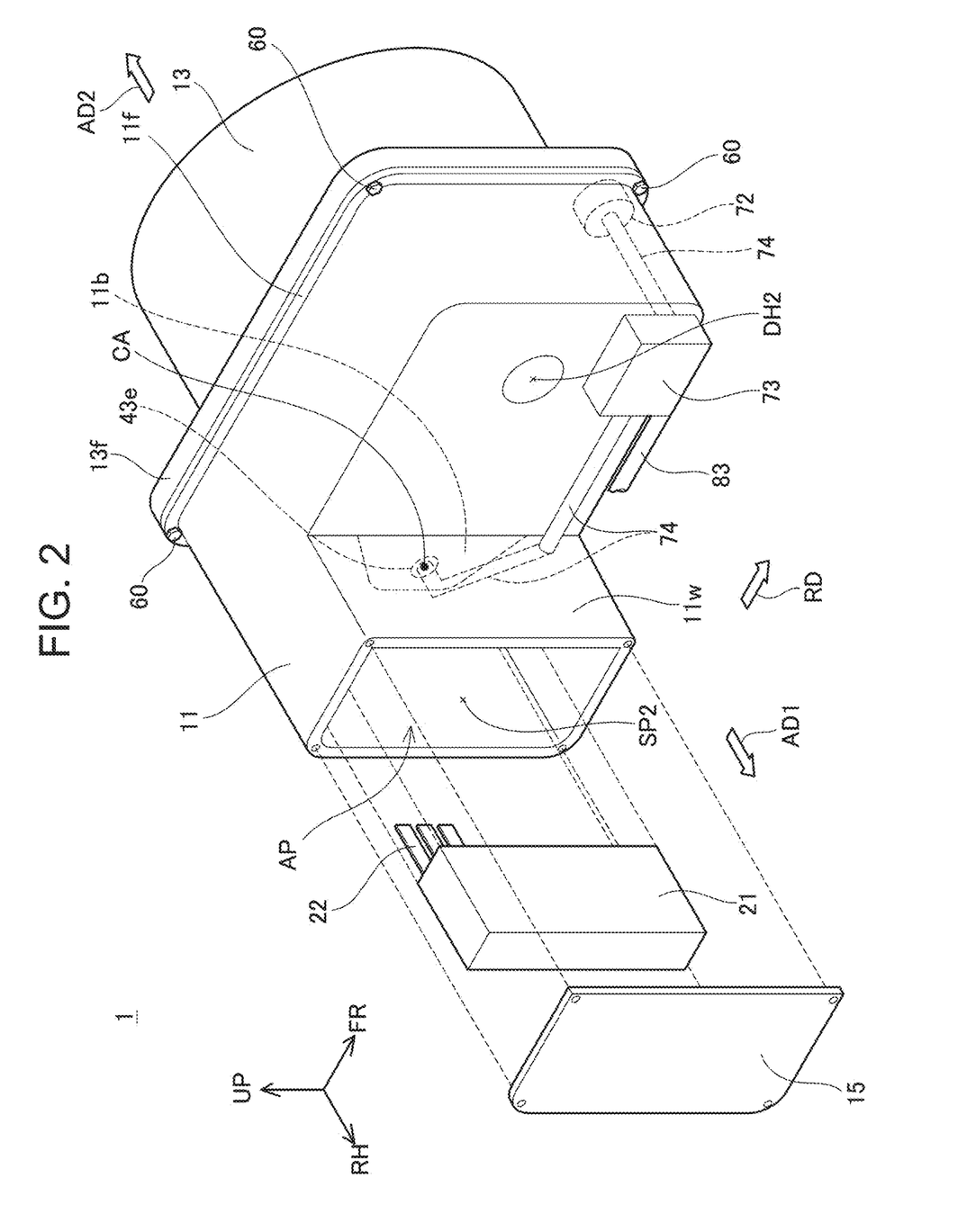
FIG. 2 is a perspective view of the drive device.

FIG. 2 shows a perspective view of the drive device 1. FIG. 2 shows a state where the lid portion 15 and the electric power conversion unit 21 have been detached. Further, the position of one end 43e of the motor shaft 43 is shown by a dotted line. As shown in FIG. 1 and FIG. 2, in the first case 11, an electric unit chamber SP2 including the opening portion AP is provided. The opening portion AP can be tightly closed by fastening the lid portion 15 by the bolts 60. That is, the electric unit chamber SP2 is isolated from the motor chamber 31 and the gear chamber SP1 in a liquid-tight manner. In the electric unit chamber SP2, the electric power conversion unit 21 is contained. The electric power conversion unit 21 is an elemental part for controlling the electric power that is supplied to the motor 40 and the electric power that is generated by the motor 40. Examples of components included in the electric power conversion unit 21 include an inverter and a converter.

One side in an axial direction AD1 is defined as a side on which the shaft gear 51 is disposed in the axial direction of the central axis CA of the motor shaft 43. Further, the other side in the axial direction AD2 is defined as the opposite side of the one side in the axial direction AD1. Further, a radial direction RD is defined as a direction perpendicular to the central axis CA.

Configurations of Oil Cooling System and Water Cooling System

The drive device 1 includes an oil cooling system and a water cooling system. First, the oil cooling system will be described. The oil cooling system includes a strainer 71, an oil pump 72, an oil cooler 73, an oil passage 74, and a shaft-center flow passage 75. That is, in the embodiment, a first heat medium is oil, and a second heat medium is water.

The shaft-center flow passage 75 is a flow passage that is formed on an axis line of the motor shaft 43 having a hollow shape (cylindrical shape). Further, the motor shaft 43 includes the one end 43e on the one side in the axial direction AD1. The one end 43e is positioned in the gear chamber SP1. On the one end 43e, an inflow port for the shaft-center flow passage 75 is formed. The one end 43e is supported by a bearing 59. The bearing 59 is fixed to a partition wall 11b between the gear chamber SP1 and the electric unit chamber SP2.

The oil passage 74 is a pathway through which the oil is supplied to the motor 40. As the structure of the oil passage 74, various structures may be adopted. For example, a pipe member may be adopted, or a tunnel formed on a wall surface may be adopted. In the embodiment, at least a part of the oil passage 74 is constituted by a pipe member.

The oil passage 74 connects a discharge port of the oil pump 72 and an inflow port of the oil cooler 73, and connects a discharge port of the oil cooler 73 and the one end 43e of the motor shaft 43. In other words, the oil cooler 73 is disposed on a section of the oil passage 74 where the oil pump 72 and the one end 43e of the motor shaft 43 are connected. Through the oil passage 74, the oil stored in the gear chamber SP1 can be supplied to the shaft-center flow passage 75 of the motor shaft 43.

The strainer 71 is disposed in the storage portion 58. The strainer 71 is connected with a suction port of the oil pump 72. The oil pump 72 is disposed on the other side in the axial direction AD2 of the gear chamber SP1. The oil pump 72 sucks the oil 61 in the storage portion 58, through the strainer 71. Then, the oil pump 72 feeds the sucked oil to the oil cooler 73 through the oil passage 74.

The oil cooler 73 is a heat exchanger that cools the oil by the heat exchange with coolant. The oil cooler 73 is positioned on the one side in the axial direction AD1 of the gear chamber SP1. That is, the oil cooler 73 and the oil pump 72 face each other through the gear chamber SP1. The oil cooler 73 overlaps with the gear chamber SP1 in the axial direction of the central axis CA. Further, the oil cooler 73 overlaps with the electric unit chamber SP2 in the radial direction RD. In the oil cooler 73, the oil passage 74 and a water passage 83 are disposed so as to face each other. In other words, the oil cooler 73 is provided on the oil passage 74 and the water passage 83. In the embodiment, the oil passage 74 is an example of the heat medium pathway.

The discharge port of the oil cooler 73 and the one end 43e of the motor shaft 43 are connected by the oil passage 74. The oil passage 74 that connects the oil cooler 73 and the one end 43e is positioned on the one side in the axial direction AD1 of the gear chamber SP1. Specifically, a part of the electric unit chamber SP2 is positioned on an extension line of the motor shaft 43 to the one side in the axial direction AD1 (see an area A1). The oil passage 74 pierces through a wall surface 11w that demarcates the electric unit chamber SP2, from the exterior of the casing 10, and extends to the interior of the electric unit chamber SP2 (see an area A2). Moreover, the oil passage 74 passes through the interior of the electric unit chamber SP2, and penetrates through the partition wall 11b (see an area A3). An end portion of the oil passage 74 is connected with the shaft-center flow passage 75 at the one end 43e of the motor shaft 43.

On the shaft-center flow passage 75, a plurality of discharge holes (not illustrated) that passes in the radial direction is provided. The oil flows through the shaft-center flow passage 75, to the other side in the axial direction AD2. The oil flows out of the discharge holes and an end portion of the shaft-center flow passage 75 on the other side in the axial direction AD2, and is supplied to the rotor 42, the stator 41, and the like. The oil supplied to the motor 40 through the shaft-center flow passage 75 flows down to the lower side in the motor chamber 31. Then, the flowing-down oil passes through a communication hole 16 that is provided on a division wall between the motor chamber 31 and the gear chamber SP1, and returns to the storage portion 58 in the gear chamber SP1.

Next, the water cooling system will be described. The water system includes a water pump 81, a radiator 82, and the water passage 83. The water passage 83 is a pathway through which coolant is supplied to the electric power conversion unit 21. The water passage 83 is a pathway through which the coolant circulates from the water pump 81 to the water pump 81 via the radiator 82, the electric power conversion unit 21, and the oil cooler 73. The coolant that circulates through the water passage 83 can cool the electric power conversion unit 21, and can cool the oil in the oil cooler 73.

Effect

Figure 3:
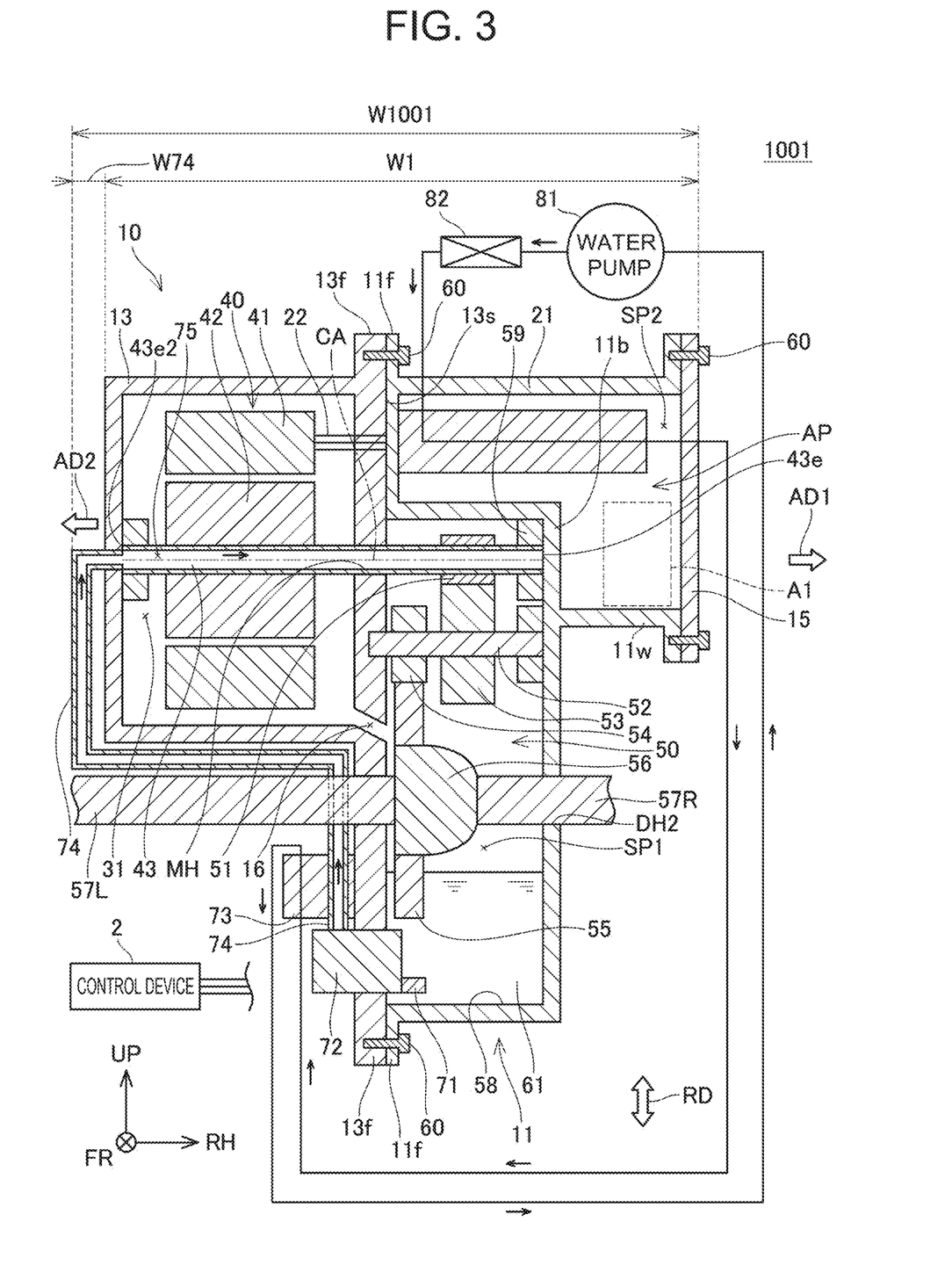
FIG. 3 is a sectional view showing a schematic configuration of a drive device in a comparative example.

First, a problem will be described with use of a drive device 1001 in a comparative example in FIG. 3. Common elemental parts between the drive device 1001 in the comparative example and the drive device 1 (FIG. 1) in the embodiment are denoted by identical reference characters. In the drive device 1001 in the comparative example, the motor shaft 43 includes another end 43e2 on the other side in the axial direction AD2. On the other end 43e2, the inflow port for the shaft-center flow passage 75 is formed. The oil passage 74 connects the discharge port of the oil cooler 73 and the other end 43e2 of the motor shaft 43. That is, in the drive device 1 (FIG. 1) in the embodiment, the oil passage 74 is positioned on the one side in the axial direction AD1 of the gear chamber SP1. On the other hand, in the drive device 1001 (FIG. 3) in the comparative example, the oil passage 74 is positioned on the other side in the axial direction AD2 of the motor chamber 31. Accordingly, the oil passage 74 protrudes from an end surface 13e of the motor case 13 by a width W74. Therefore, in the drive device 1001 in the comparative example, a width W1001 in the central axis CA is larger than a width W1 of the casing 10, by the width W74.

On the other hand, in the drive device 1 (FIG. 1) in the embodiment, a part of the electric unit chamber SP2 is positioned on the one side in the axial direction AD1 of the one end 43e of the motor shaft 43. That is, the electric unit chamber SP2 can be caused to protrude to the one side in the axial direction AD1 of the one end 43e of the motor shaft 43. More specifically, the electric unit chamber SP2 can be positioned on the one side in the axial direction AD1 of the oil passage 74, by a distance DIS. Moreover, the oil passage 74 is connected with the one end 43e of the motor shaft 43. Thereby, the oil passage 74 can be housed in a range in which the electric unit chamber SP2 protrudes. In other words, the width W1 of the drive device 1 in the direction of the central axis CA can be determined not by the oil passage 74 but by the electric unit chamber SP2. Accordingly, the width W1 of the drive device 1 is enabled to be equivalent to the width of the casing 10. It is possible to restrain the width W1 of the drive device 1 from being increased by the oil passage 74. It is possible to achieve a further reduction in the size of the drive device 1.

As shown in FIG. 1, in an area on the opposite side of the motor shaft 43 from the gear unit 50, a space is formed due to a dimensional difference between the motor 40 and the gear unit 50. In this space, a part of the electric unit chamber SP2 is disposed. That is, at least a part of the electric unit chamber SP2 overlaps with the gear chamber SP1 in the radial direction RD perpendicular to the central axis CA. Thereby, it is possible to effectively use the space around the motor shaft 43. Consequently, it is possible to decrease the protrusion amount of the electric unit chamber SP2 on the one side in the axial direction AD1. It is possible to achieve the reduction in the size of the drive device 1.

Further, at least a part of the electric unit chamber SP2 overlaps with the motor chamber 31 in the axial direction of the central axis CA. This also makes it possible to effectively use the space around the motor shaft 43. Consequently, it is possible to decrease the protrusion amount of the electric unit chamber SP2 in the radial direction RD.

Embodiment 2

Figure 4:
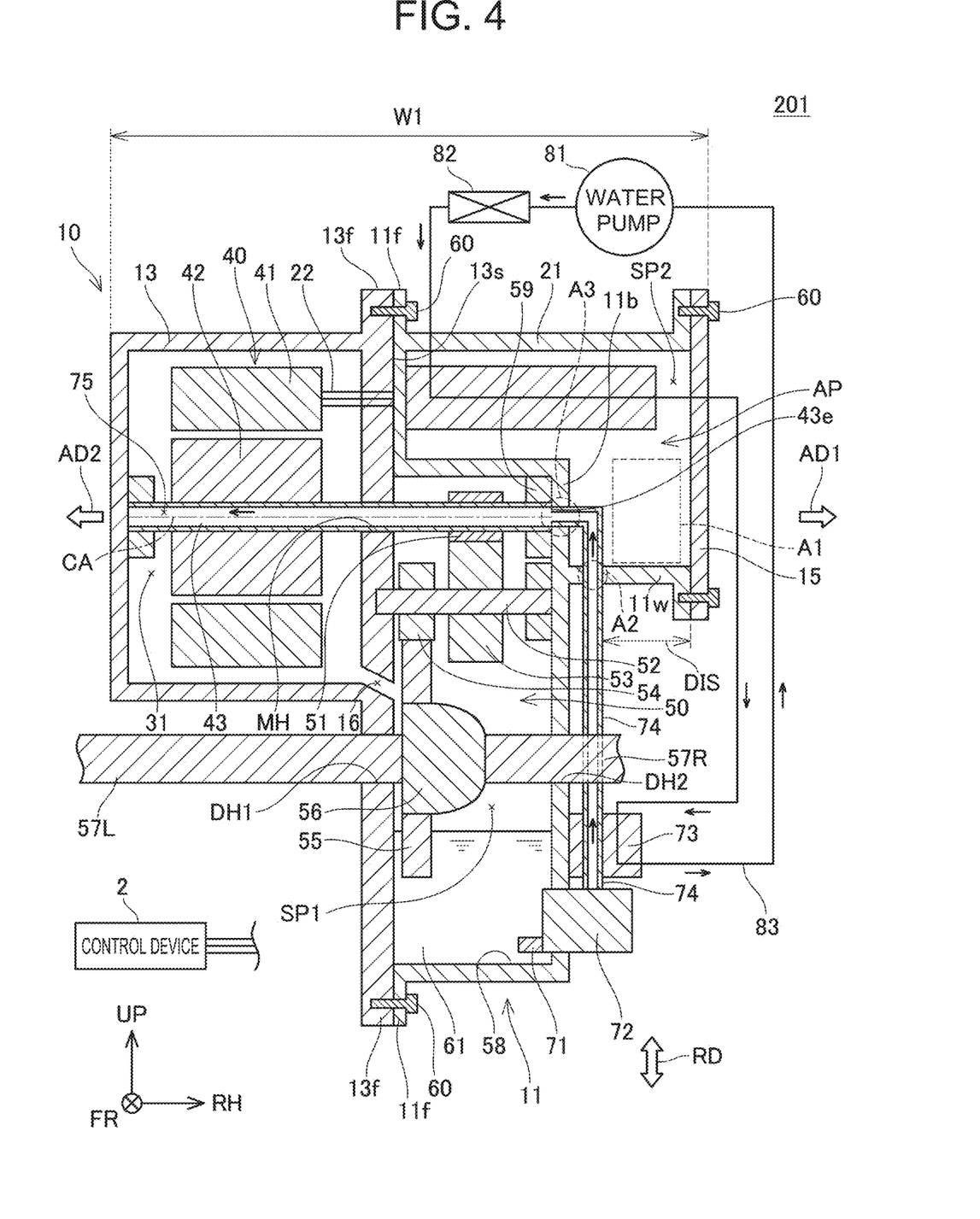
FIG. 4 is a sectional view showing a schematic configuration of a drive device.

An embodiment 2 is different from the embodiment 1 in the manner of the disposition of the oil pump 72. Common elemental parts between the embodiment 1 and the embodiment 2 are denoted by identical reference characters, and descriptions thereof are omitted.

FIG. 4 shows a schematic configuration of a drive device 201 in the embodiment 2. FIG. 4 is a sectional view that is illustrated similarly to FIG. 1. The oil pump 72 is positioned on the one side in the axial direction AD1 of the gear chamber SP1. That is, both of the oil pump 72 and the oil cooler 73 are disposed on the same direction side of the gear chamber SP1. The oil pump 72 and the oil cooler 73 overlap with the gear chamber SP1 in the axial direction of the central axis CA. Further, the oil pump 72 and the oil cooler 73 overlap with the electric unit chamber SP2 in the radial direction RD. The oil passage 74 connects the discharge port of the oil pump 72 and the inflow port of the oil cooler 73, and connects the discharge port of the oil cooler 73 and the one end 43e of the motor shaft 43.

Also in the drive device 201 in the embodiment 2, the oil passage 74 can be housed in the range in which the electric unit chamber SP2 protrudes. It is possible to restrain the width W1 of the drive device 1 from being increased by the oil passage 74.

Embodiment 3

An embodiment 3 is different from the embodiment 1 in the manner of the disposition of the oil cooler 73. Common elemental parts between the embodiment 1 and the embodiment 3 are denoted by identical reference characters, and descriptions thereof are omitted.

Figure 5:
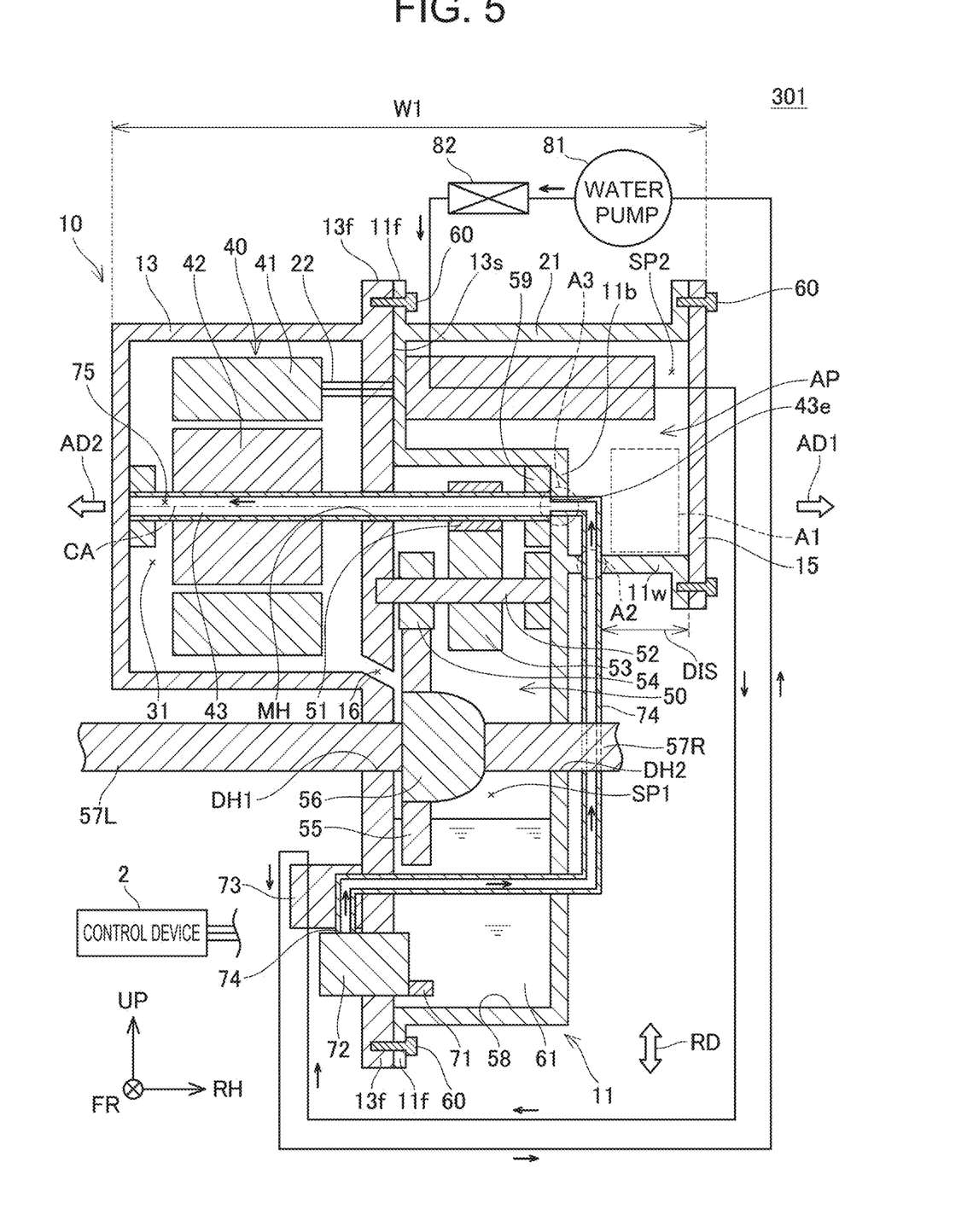
FIG. 5 is a sectional view showing a schematic configuration of a drive device.

FIG. 5 shows a schematic configuration of a drive device 301 in the embodiment 3. FIG. 5 is a sectional view that is illustrated similarly to FIG. 1. The oil cooler 73 is positioned on the axial-directional other side AD2 of the gear chamber SP1. That is, both of the oil pump 72 and the oil cooler 73 are disposed on the same direction side of the gear chamber SP1. The oil cooler 73 overlaps with the gear chamber SP1 in the axial direction of the central axis CA. The oil passage 74 connects the discharge port of the oil pump 72 and the inflow port of the oil cooler 73, and connects the discharge port of the oil cooler 73 and the one end 43e of the motor shaft 43.

Also in the drive device 301 in the embodiment 3, it is possible to restrain the width W1 of the drive device 1 from being increased by the oil passage 74.

Embodiment 4

Figure 6:
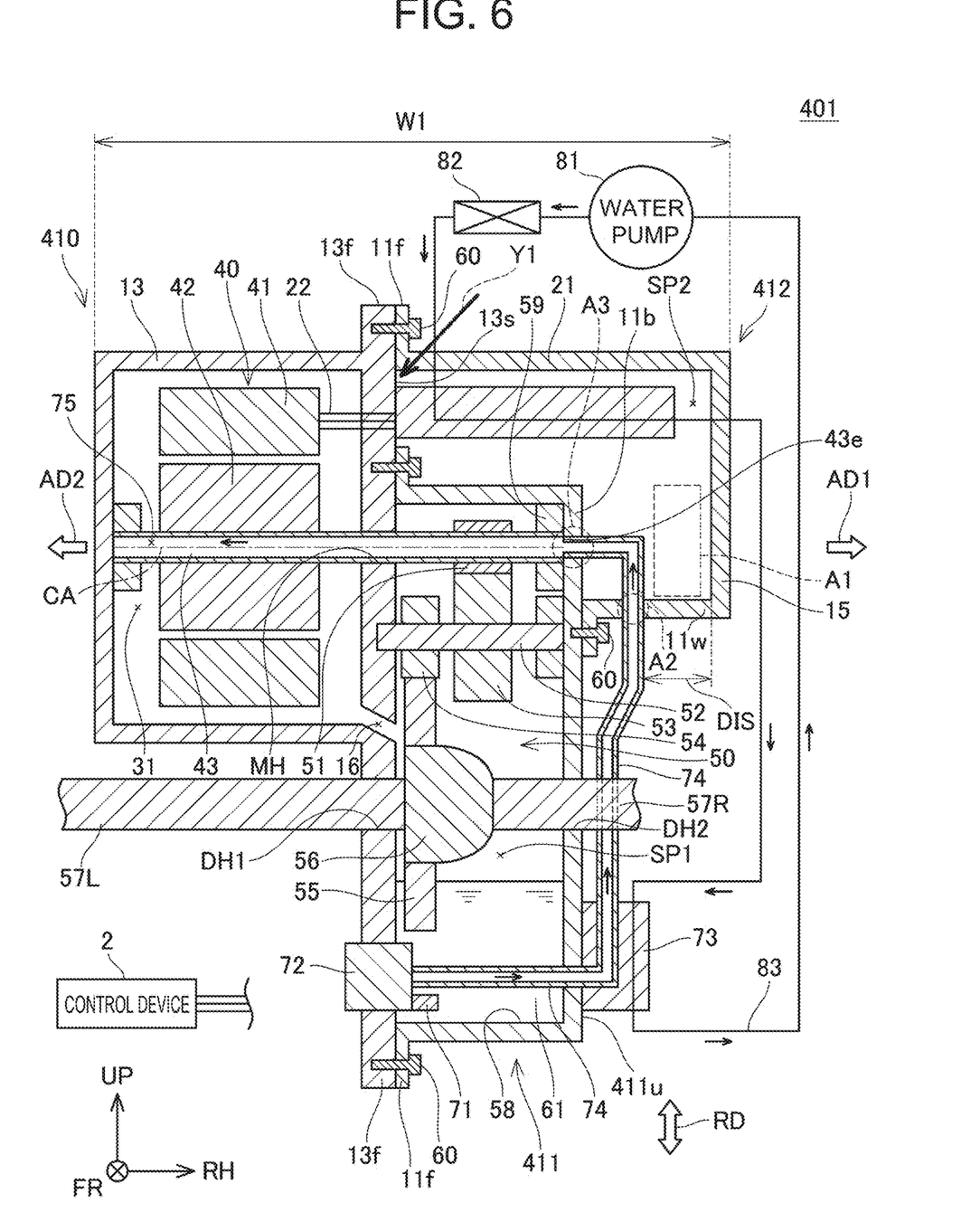
FIG. 6 is a sectional view showing a schematic configuration of a drive device.

An embodiment 4 is different from the embodiment 1 in the manner of the casing. Common elemental parts between the embodiment 1 and the embodiment 4 are denoted by identical reference characters, and descriptions thereof are omitted. FIG. 6 shows a schematic configuration of a drive device 401 in the embodiment 4. FIG. 6 is a sectional view that is illustrated similarly to FIG. 1. Further, in FIG. 6, elements specific to the embodiment 4 are distinguished by being denoted by reference numerals in the 400s.

A casing 410 includes a first case 411, a second case 412, and the motor case 13. The first case 411 is fastened to the facing surface 13s of the motor case 13 by a plurality of bolts 60. The gear chamber SP1 is demarcated between the motor case 13 and the first case 411.

The second case 412 has a box shape in which one surface is opened. The second case 412 is fastened to the facing surface 13s and an upper surface 411u of the first case 411 by a plurality of bolts 60. Thereby, the electric unit chamber SP2 is demarcated from the motor case 13 and the first case 411 to the second case 412. Accordingly, by mounting the second case 412 on the first case 411, a part of the electric unit chamber SP2 can be positioned on the extension line of the motor shaft 43 to the one side in the axial direction AD1 (see the area A1).

Effect

The first case 411 that houses the gear unit 50 and the second case 412 that houses the electric power conversion unit 21 are configured as separate members, and thereby, the electric power conversion unit 21 can be attached in a state where only the second case 412 has been detached from the motor case 13. Thereby, when the electric power conversion unit 21 is attached, the second case 412 does not interfere. Accordingly, it is possible to expand directions in which a tool can access a contact portion between the electric power conversion unit 21 and the facing surface 13s (see a dotted-line arrow Y1). It is possible to enhance the ease of the mounting of the electric power conversion unit 21.

The embodiments have been described above in detail. The embodiments are just examples, and do not limit the claims. The technologies described in the claims include various modifications and alterations of the above-described specific examples. Technical elements described in the specification or the drawings exert technical utilities independently or by various combinations, and are not limited to combinations described in the claims at the time of the filing. Further, the technologies exemplified in the specification or the drawings concurrently achieve a plurality of purposes, and have technical utilities simply by achieving one of the purposes.

Modification

The vehicle equipped with the drive device in the specification is not limited to a battery electric vehicle. For example, the drive device in the specification can be equipped in a hybrid electric vehicle or a plug-in hybrid electric vehicle. In this case, in the casing of the drive device in the specification, a plurality of motors may be contained, or a planetary gear mechanism may be contained. Further, the drive device in the specification can be applied also to a vehicle in which an electric motor is used for at least a part of traveling, as exemplified by a fuel cell electric vehicle.

What is claimed is:

1. A drive device comprising:
a motor housed in a motor chamber and including a motor shaft, the motor shaft being provided with a flow passage at a shaft center of the motor shaft;
a casing including the motor chamber, a gear chamber, and an electric unit chamber;
a gear unit housed in the gear chamber and configured to be mechanically connected with one end of the motor shaft on one side in an axial direction;
an electric unit housed in the electric unit chamber and configured to be electrically connected with the motor; and
a heat medium pathway configured to supply a heat medium stored in the gear chamber, to the flow passage of the motor shaft, wherein
the one end of the motor shaft is positioned in the gear chamber,
at least a part of the electric unit chamber is positioned on the one side in the axial direction relative to the one end of the motor shaft, and
the heat medium pathway is connected with the flow passage of the motor shaft at the one end of the motor shaft.

2. The drive device according to claim 1, wherein at least the part of the electric unit chamber is positioned on the one side in the axial direction relative to the heat medium pathway.

3. The drive device according to claim 2, wherein at least the part of the electric unit chamber overlaps with the gear chamber viewed from a direction perpendicular to the axial direction.

4. The drive device according to claim 3, wherein at least the part of the electric unit chamber overlaps with the motor chamber viewed from the axial direction.

5. The drive device according to claim 1, wherein at least a part of the heat medium pathway is positioned on the one side in the axial direction relative to the gear chamber.

6. The drive device according to claim 5, wherein:
the part of the electric unit chamber is positioned on an extension line of the motor shaft to the one side in the axial direction;
the one end of the motor shaft is supported by a partition wall between the gear chamber and the electric unit chamber; and
the heat medium pathway passes through an interior of the electric unit chamber, penetrates through the partition wall, and is connected with the flow passage.

7. The drive device according to claim 6, wherein the heat medium pathway pierces through a wall surface from an exterior of the casing, and extends to the interior of the electric unit chamber of the casing, the wall surface demarcating the electric unit chamber.

8. The drive device according to claim 1, further comprising a pump configured to feed the heat medium stored in a lower portion of the gear chamber, to the heat medium pathway, wherein
the pump is positioned on the one side in the axial direction or the other side in the axial direction relative to the gear chamber.

9. The drive device according to claim 8, further comprising a heat medium cooler disposed on the heat medium pathway and configured to cool the heat medium, wherein
the heat medium cooler is positioned on the one side in the axial direction or the other side in the axial direction relative to the gear chamber.

10. The drive device according to claim 1, wherein:
the motor chamber and the gear chamber are connected by a communication hole through which the heat medium is configured to flow; and
the electric unit chamber is isolated from the motor chamber and the gear chamber in a liquid-tight manner.

11. The drive device according to claim 1, wherein:
the casing includes
a motor case including the motor chamber,
a gear case configured to demarcate at least a part of the gear chamber, and
an electric unit case configured to demarcate at least the part of the electric unit chamber; and
the gear case and the electric unit case are fastened to the motor case by a plurality of fastening members.

* * * * *